United States Patent [19]

Smith

[11] 4,304,711
[45] Dec. 8, 1981

[54] PIGMENT COMPOSITIONS

[75] Inventor: Derek S. H. Smith, Brookfield, Scotland

[73] Assignee: Ciba-Geigy Corporation, Ardsley, N.Y.

[21] Appl. No.: 21,297

[22] Filed: Mar. 16, 1979

[30] Foreign Application Priority Data

Mar. 18, 1978 [GB] United Kingdom .............. 10829/78
Mar. 18, 1978 [GB] United Kingdom .............. 10830/78

[51] Int. Cl.³ .......................... C08J 3/20; C08K 5/23; C08L 23/00
[52] U.S. Cl. .............................. 260/42.21; 260/39 P; 260/40 R; 260/17 R; 260/193
[58] Field of Search ................... 260/42.21, 193, 39 P, 260/40 R, 17 R

[56] References Cited

U.S. PATENT DOCUMENTS

| | | | |
|---|---|---|---|
| 1,059,599 | 4/1913 | Desamari | 260/193 |
| 1,086,155 | 2/1914 | Geldermann et al. | 260/193 |
| 3,036,059 | 5/1962 | Ehrhardt et al. | 260/193 X |

FOREIGN PATENT DOCUMENTS

| | | | |
|---|---|---|---|
| 1001494 | 8/1965 | United Kingdom | 260/193 |
| 1019000 | 2/1966 | United Kingdom | 260/193 |

*Primary Examiner*—Allan Lieberman
*Attorney, Agent, or Firm*—Harry Falber

[57] ABSTRACT

A colored synthetic plastics mass having incorporated therein the calcium salt of the dyestuff from diazotized 2-nitroaniline-4-sulphonic acid and acetoacet-o-chloroanilide.

2 Claims, No Drawings

PIGMENT COMPOSITIONS

This invention relates to the manufacture of coloured masses from synthetic plastics.

It is a requirement of coloured plastic masses that the colouring constituent should not be altered by the temperatures used for moulding the plastic, and should not bleed, that is to say, should not be capable of casting out into differently coloured or uncoloured plastic masses worked up with the plastic in question. In addition the dyeing should be fast to light and soap. In the green-shade yellow area, Pigment Yellow 3, the monoazo pigment from diazotized 2-nitro-4-chloroaniline and acetoacet-o-chloranilide, generally fulfils the requirements of lightfastness and heat stability and, in addition, has high colouristic strength, but shows very poor resistance to migration and is thus not used for colouring plastics.

Moreover it is known that Pigment Yellow 3, when used in compositions for example consisting of an alkyd resin, provides a strong, bright greenish-yellow shade film of good light and weather fastness. However, stoving alkyd-melamine paint compositions comprising an alkyd resin, a melamine-formaldehyde resin and Pigment Yellow 3 together with a suitable diluent have been unsuccessful commercially due to their exceptionally poor overspray fastness and because of a pronounced tendency for the pigment to bloom through the surface of the paint film, giving an unacceptable finish.

On the other hand, Pigment Yellow 61, the calcium salt of the monoazo dyestuff from diazotized o-nitroaniline-4-sulfonic acid and acetoacet anilide, has improved migration resistance but inferior lightfastness and relatively low colouristic strength, even in the improved form described and claimed in Belgian Pat. No. 854223.

Furthermore stoving alkyd-melamine paint compositions comprising a melamine-formaldehyde resin and Pigment Yellow 61 in a suitable diluent are known.

These compositions yield paint films of a similar shade to those obtained utilising Pigment Yellow 3 in the same composition, but which do not show the deficiencies of overspray fastness and tendency towards blooming exhibited by such compositions. However, stoving alkyd-melamine paint compositions of the type described which incorporate a Pigment Yellow 61 are particularly inferior to compositions which incorporate a Pigment Yellow 3 in terms of the colour strength of the paint film produced.

It is therefore surprising to find that the calcium salt of the dyestuff from diazotized 2-nitroaniline-4-sulfonic acid and acetoacet-o-chloranilide is not only bleed resistent, but is of almost identical shade as Pigment Yellow 61, has considerably improved fastness to light, and of greatly increased colour strength over Pigment Yellow 61 and the product of Belgian Pat. No. 854 223. It has also improved heat stability in PVC over both Pigment Yellow 3 and 61.

With the above pigment is also obtained a paint film of very good fastness to overspray and freedom from blooming, which exhibits a greenish-yellow shade colour of far superior strength to films obtained from paint compositions obtained by equal quantities of Pigment Yellow 3 and 61. Such paint films utilising a pigment of the invention also exhibit excellent light and weather fastness. Moreover, paint compositions comprising the pigment of invention and alkyd, alkyd melamine, acrylic or acrylic-melamine resins of either air-drying, stoving, thermoplastic or thermosetting types show the same useful properties.

Accordingly the present invention provides coloured synthetic plastics masses having incorporated therein the calcium salt of the monoazo dyestuff from diazotized 2-nitroaniline-4-sulphonic acid and acetoacet-o-chloroanilide.

Other colouring constituents may be added as desired in order to modify the colour obtained.

The term "synthetic plastic" includes all those man-made resins produced, for example, by homopolymerisation or copolymerisation of monomers having in common the vinyl group ($CH_2=CH-$) as in polyethylene, polypropylene, polystyrene, polyvinyl acetate, polyvinyl chloride, or the vinylidene group ($CH_2=CR$) as in polymethyl methacrylate and polyvinylidene chloride, or olefins carrying increased substitution as in polytetrafluoroethylene, polychlorotrifluoroethylene, polyvinyl and polyvinylidene fluorides, tetrafluoroethylene/hexafluoropropylene copolymers, or by blends (including ABS plastics), copolymers of styrene with, for example, acrylonitrile, divinylbenzene, maleic anhydride, related materials (polymethylstyrenes, polychlorostyrenes, polyvinyl-naphthalene and polyacenaphthylene), polyvinylpyridines, poly-N-vinylcarbazole, and poly-p-xylylenes.

The above plastics compositions may contain plasticisers such as are commonly in use in the industry, for example dialkyl ($C_7-C_9$) phthalate, dibutyl phthalate, dicapryl phthalate, di-2-ethyl hexyl phthalate, di-isooctyl phthalate, dinonyl phthalate, dimethyl phthalate, diethyl phthalate, "Cellosolve" phthalate, butyl acetyl ricinoleate, dialkyl ($C_7-C_9$) sebacate, dialkyl ($C_7-C_9$) adipate, dibutyl adipate, dibutyl sebacate, di-iso-octyl adipate, di-iso-octyl sebacate, dioctyl adipate, dioctyl sebacate, 1:3-butanediol adipate, trialkyl ($C_7-C_9$) phosphate, trioctyl phosphate, triaryl phosphates, such as tritolyl phosphate, trixylenyl phosphate and alkylated phenyl phosphates, mixed alkyl/aryl phosphates, polypropylene adipate, polypropylene adipate/laurate, polypropylene sebacate, "Iranolin" and other mineral oil extenders, "Cereclor" (chlorinated paraffin wax), Mesamoll (aryl ester of alkyl sulphonic acid), toluene sulphonamides, poly-α-methyl-styrene, castor oil, dialkyl tin compounds, oleates, stearates, adipates and benzoates of higher glycols, ethyl palmitate, butyl lactate, butyl phthalyl butyl glycollate, methyl phthalyl methyl glycollate, benzyl butyl phthalate.

In plastics compositions these plasticisers are often accompanied by such substances as fillers which may be inorganic, such as asbestos (fibre and powder), mica, glass fibre, barytes, calcium carbonates, carbon black, carborundum, coke dust, china clay, diatomaceous earth, graphite, lithopone, magnesium oxide, pumice powder, silica, slate dust, sulphur, talc, titanium dioxide, zinc oxide, or organic, such as alpha cellulose, cotton flock, flax hemp, jute, paper fabrics (chopped and unchopped), sawdust, sisal, woodflour, coconut, soya bean, walnut and peanut shell flours, keratin, leather-dust, nylon and other synthetic fibres. Moreover, certain plastics preparations may contain solvents in addition to plasticisers, for example alcohols, such as methanol, ethanol, isopropanol and n-butanol; ketones, such as acetone, methyl ethyl ketone, methyl isobutyl ketone, methyl isoamyl ketone and isophorone; esters, such as ethyl acetate, and butyl acetate; glycol-ethers, such as ethylene glycol monomethyl ether, ethylene glycol monoethyl ether, ethylene glycol monobutyl ether, ethylene glycol monophenyl ether and diethylene glycol monomethyl ether, ethers and polyethers, such as ethyl ether, butyl ether, dioxane, dichloroethyl ether and glycol ethers; hydrocarbons, chlorinated compounds, such as ethylene dichloride, carbon tetrachloride and others commonly in use in the industry, such as carbon disulphide, pyridine.

Synthetic plastics preparations may also contain stabilisers as are commonly in use in the industry, such as barium stearate, barium ricinoleate, cadmium stearate, calcium stearate, basic lead carbonate, lead stearate, dibasic lead stearate, dibasic lead phosphate, tribasic lead sulphate, lead chlorosilicate complex, lead salicylate, dibutyl tin dilaurate, dibutyl tin maleate, organic epoxides, or a mixture of such stabilisers, and ultra-violet absorbers which are generally based on benzotriazole or benzophenone. In addition the said preparations may contain such other additives as lubricants, e.g. stearic acid, metal stearates, petroleum based waxes, mineral and vegetable oils, low molecular weight polyethylene, amide and ester waxes and silicone oils, fungicides, e.g. organotins, mercaptans, quaternary ammonium compounds, arsenics and copper compounds, flame retardants, e.g. phosphate esters, chlorinated hydrocarbons and barium metaborate, antistatic agents, e.g. fatty amines and amides, phosphate esters and quaternary ammonium salts.

The product of the invention may be produced by compounding, either by formation of a plasticiser dispersion (plastisol), melt compounding or dry blending, followed by processing by one or more of the methods commonly in use in the industry such as calendering, extrusion, injection moulding, thermoforming and compression moulding.

The term "synthetic plastic" also includes paint compositions having all film-forming resins or binders commonly in use in the paint industry, for example, those described in the paint and varnish tables of Karsten, 4th and 5th edition, Hanover, 1967 and 1972 respectively, and/or in Wagner and Sarx's book on paint resins, 5th edition, Munich 1971, or in the Surface Coating Resin Index 1968 published by the British Plastics Federation and the Surface Coating Resin Manufacturer's Association.

Preferred classes of film-forming resin or binder are (a) Polyester condensation resins or alkyds formed by repeated esterification reactions between polyhydric alcohols and di- or polybasic carboxylic acids or anhydrides, particularly such condensation resins modified by incorporating as a third component a monobasic carboxylic acid with a long hydrocarbon chain or certain chemically produced monobasic acids such as are in common use in the industry.

Examples of preferred polyhydric alcohols are glycerol, pentaerythritol, trimethylolpropane, trimethylolethane, ethylene glycol and diethylene glycol.

Examples of preferred di- or polybasic carboxylic acids or anhydrides are phthalic anhydride, isophthalic anhydride, terephthalic anhydride, maleic anhydride, maleic acid, fumaric acid, citric acid, sebacic acid, succinic acid and azelaic acid. Examples of preferred monobasic carboxylic acids with a long hydrocarbon chain are derivatives of natural oils, such as linseed, coconut, pelargonic, hydrogenated castor, palm, groundnut, peanut, soya, tung, safflower, castor, sunflower, segregated marine and marine oils, e.g. lauric acid and linoleic acid. Mixtures of these monobasic carboxylic acids may also be used, such as a mixture of acids derived from safflower and sunflower oil or a mixture of linseed and tung oil.

Examples of preferred chemically produced monobasic acids are: benzoic acid, p-tertiarybutylbenzoic acid, 2-ethylhexanoic acid and a mixture of heavily branched acids with 9 to 11 carbon atoms with most ($\geq 93\%$) of the carboxylic groups attached to a quaternary carbon atom, such as are marketed under the trade names Versatic 911 and Cardura (Shell Chemicals Ltd.).

(b) Aminoplast resins such as urea-formaldehyde condensation resins and melamine-formaldehyde condensation resins. These resins are particularly preferred when used in conjunction with alkyd resins of the types described above.

(c) Thermoplastic acrylic resins obtained by the polymerisation of acrylic acid and methacrylic acid or of esters of acrylic and methacrylic acid, or of functional derivatives of acrylic acid and methacrylic acid. Examples of preferred esters of acrylic and methacrylic acid are methyl-methacrylate, ethyl-methacrylate, stearyl-methacrylate, cyclohexyl-methacrylate, 2-ethylhexylmethacrylate, 2-hydroxyethylmethacrylate, 2-hydroxypropylmethacrylate, ethylenedimethacrylate, trimethylolpropanetrimethylacrylate, butylenedimethacrylate, dimethylaminoethylacrylate, methylacrylate, ethylacrylate, n-butylacrylate and 2-ethylhexylacrylate.

Examples of preferred functional derivatives of acrylic acid are acrylamide and hydroxyacrylic acid. Acrylic acid and methacrylic acid are also preferred monomers.

Thermoplastic acrylic resins may be used alone or in combination with nitrocellulose or vinyl resins. Preferred examples of the use of such combined resins are acrylic/methacrylic copolymers or polymethacrylic esters, such as polymethyl and polybutylmethacrylate used in combination with a styrene copolymer, vinyl copolymer or polyvinylacetate.

(d) Thermosetting acrylic resins which may be cross-linked by stoving processes. The resins consist of relatively short-chain polymers of a minor amount of acrylic acid or a derivative thereof having a free functional group with a larger quantity of an acrylic or methacrylic ester optionally in admixture with a vinyl monomer, such as styrene. Suitable derivatives of acrylic acid and acrylic or methacrylic esters are the same as those used in thermoplastic acrylic resins (c).

Particularly preferred resins are polymers of acrylic acid and hydroxyacrylic acid. Preferred cross-linking agents are amino resins, particularly melamine-formaldehyde resins. The diluents or solvents used in the paint compositions are those commonly in use in the paint industry, and the choice of diluent may depend on the type of binder used. Suitable preferred diluents are aromatic and aliphatic hydrocarbons, such as xylene, toluene or white spirit; chlorinated aliphatic hydrocarbons, for example trichloroethylene; aliphatic alcohols, such as butanol; aliphatic ketones, such as methyl ethyl ketone. Also preferred are butyl acetate, cellosolve acetate, methyl cellosolve acetate, methyl cellosolve, and industrial methylated spirit. Mixtures of these solvents may also be used.

Particularly preferred are white spirit and mixtures of xylene and butanol.

The paint compositions are prepared by dispersing the pigment in the resin system in the presence of diluent by a variety of conventional methods. The pigment may be dispersed by grinding in the presence of binder or resin and diluent in a flat stone mill, cone mill, roller mill, such as a triple roll mill or single roll mill, or preferably a ball mill, bead mill, carborundum mill or sand mill, or by dispersion using an attritor or a high-speed impeller mixer, or using a kinetic dispersion mill, such as a Kady Mill. Prior to grinding, the pigment may be optionally premixed with the liquid components to a paste using a propellor mixer or stirrer, planetary mixer, or a heavy duty mixer or kneader. After grinding, the paint may be optionally finished by the addition of further resin and diluent, and/or by the addition of suitable fillers and extenders, depending on the application, as is common industrial practice. Where necessary, the paint composition may contain a small percentage of a suitable drier, for example inorganic salts of naphthenic acid, such as cobalt naphthenate. Tinting of the paint composition may be carried out by the addition of other paint compositions produced in a similar fashion. These operations may be carried out, if desired, by simple stirring. The amounts of ingredients present in the paint composition can vary greatly depending on the intended application and even on the desired decorative aspects of the paint. Generally, fullshade air-drying alkyd paint compositions may contain from 1–20% pigment, preferably from 5–15% pigment, and more particularly 10% pigment by weight with a ratio of pigment to binder or resin of 1:4 to 1:12, preferably about 1:10 at from 20–60%, preferably about 50% medium solids. Such a paint composition usually contains less than 1% of a suitable drier, such a percentage being based on total vehicle solids. A preferred solvent for such a paint is white spirit. Such a full-shade paint may be reduced in colour strength by addition of white paint prepared in a similar fashion.

Stoving alkyd paint compositions may contain from 1–10% pigment, preferably about 6% pigment, as a fullshade paint with a pigment-binder ratio of 1:5 to 1:20, preferably about 1:6, at from 20–60%, preferably about 40% medium solids. The ratio of alkyd resin to amino resin, such as melamine-formaldehyde resin is preferably about 3:1. A preferred solvent is xylene/butanol, having a ratio of xylene to butanol of 2:1 to 6:1, preferably 3:1 to 4:1.

Full-shade thermosetting acrylic paint compositions may contain from 1–20% pigment, preferably from 6–10% with a ratio of pigment to binder of from 1:2 to 1:6, preferably 1:5, at from 20–50%, preferably 30%, medium solids. The ratio of acrylic resin to amino resin or other cross-linking agent is preferably 3:1. Thermoplastic acrylic paint compositions generally contain similar amounts of pigment and binder for a full shade paint as do thermosetting acrylic compositions. Optionally a percentage of an external plasticiser, such as sec-butyl phthalate may be added to the composition to give an improved paint film in use. Such practice is common within the industry. Full-shade stoving alkyd, thermosetting acrylic and thermoplastic acrylic paint compositions may be reduced in strength by addition of white paint in a similar manner to that described for full-shade air-drying alkyd paint compositions.

The following examples are included to illustrate the invention and a typical method of making the pigment used in the paint and plastic compositions. Parts are parts by weight.

EXAMPLE 1

Preparation of Pigment 7.8 Parts 2-nitroaniline-4-sulphonic acid, ammonium salt, are dissolved in 75 parts water at 60° C. and 10.6 parts concentrated hydrochloric acid are added. The mixture is cooled with ice to 0° C. and a solution of 2.5 parts sodium nitrite in 4 parts of water is added to form a diazonium salt slurry which is then stirred for 0°–5° C. for 30 minutes. 8.0 Parts of acetoacet-o-chloroanilide are dissolved in 100 parts of water containing 1.9 parts sodium hydroxide flake, then 1.5 parts of sodium acetate and 2.25 parts of precipitated chalk are added and the pH of the slurry brought to 7.0 by addition of sufficient glacial acetic acid (diluted 1:2 with water). This slurry is stirred for 1 hour at room temperature at pH 7.0, after which the diazonium salt slurry is run in over 1 hour and the pH falls to 4–5. The pigment slurry is stirred for a further 1 hour at pH 4–5, then heated to 80° C. with stirring. Stirring and heating at 80° C. are maintained for 15 minutes, when the mixture is filtered, washed with cold water until free from chloride ions, and oven-dried at 50°–60° C.

Analysis: Ca 4.1%; Na 0.1%.

EXAMPLE 2

A pigment—low density polyethylene composition was produced on a Schwabenthan Polymix operating under the following conditions:

| Front Roll | 125° C. | 32 r.p.m. |
| --- | --- | --- |
| Rear Roll | 110° C. | 26 r.p.m. |

Polymer (50 parts—low density polyethylene, Type DFDK 0159 (ex B.X.L.)) was banded on the front roll, the nip adjusted to 0.7 mm. and 1 part of the organic pigment of Example 1, with 0.5 parts TiO$_2$ added over a period of one minute. A further 50 parts of polymer was added and the nip opened to 1.2 mm. The hide was then cut off and repassed through the nip continually until ten minutes after the start of the pigment addition. The milled hide was cut off the mill, allowed to cool, then compression-moulded at 180° C. using 40 tons ram pressure. This gave rise to a strong green-shade yellow composition which showed greatly increased colouristic strength, light-fastness and heat stability compared to similar PVC compositions produced in an identical manner containing equal quantities of Pigment Yellow 61 or the product of Belgian Pat. No. 854.223.

EXAMPLE 3

A pigment—PVC composition was produced on a Schwabenthan Type VV mill operating under the following conditions:

| Front Roll | 150° C. | 20 r.p.m. |
| --- | --- | --- |
| Rear Roll | 110° C. | 17 r.p.m. |

1 Part of the organic pigment from Example 1 was weighed into a milling pot together with 100 parts Lonza plasticised PVC and hand-stirred just prior to milling. The homogeneous blend was then banded on the front roll (nip setting 0.3 mm.) and cut off and re-passed through the nip continuously for 7.5 minutes. The nip was opened to 0.7 mm. for the final 0.5 minute, the hide rolled to one side and removed as a smooth sheet after a total of 8 minutes. The cooled hide was then compression-moulded for 5 minutes at 180° C. Thus was obtained a strong green-shade yellow plastic composition which exhibited similar advantages as described in Example 2.

EXAMPLE 4

Preparation of Pigment Masterbatches

Pigment masterbatches were produced on a Banbury machine operating under the following conditions:

| | |
|---|---|
| Rotor speed | 2 |
| Pressure | 20 psi |
| Full water cooling | |
| Batch size | 1200 parts |
| Pigmentation | 15% |

Pigment from Example 1 was hand-tumbled into each of powdered LDPE (Alkathene 17/04/00 (ex I.C.I.)) and granular LDPE (Alkathene WNG. 17 (ex I.C.I.)) prior to compounding in the mixer.

Post-Banbury Procedures

The hot material from the Banbury mixer was calendered off a Schwabenthan Type VV mill. Roll temperatures were 150°/110° C. and nip setting 1.0 mm. The sheeted compound was cut up and the cooled material chipped.

EXAMPLE 5

Preparation of Pigmented Blown Film

The chipped masterbatch (15% pigmentation) of Example 4 was let down into granular LDPE (DFDK.0159), 500 parts total size to give 1% pigmentation in the blown film. This was prepared using a Dolci extruder under the following conditions:

| | |
|---|---|
| Temperatures | Zone 1 - 120° C. |
| | Zone 2 - 150° C. |
| | Zone 3 - 165° C. |
| | Zone 4 - 165° C. |
| | Zone 5 - 170° C. |
| | Zone 6 - 175° C. |
| | Zone 7 - 170° C. |
| Hopper cooling | |
| Screw speed | 40 r.p.m. |
| Gear | 3 |

Thus was obtained a strong green shade yellow film, which exhibited similar desirable properties as described in Example 2.

EXAMPLE 6

0.35 Parts pigment of Example 1 and 5 parts TiO$_2$ (KRONOS RN 56 (ex KRONOS Ltd.)) were weighed into a milling pot with 100 parts Lonza plasticised PVC and hand-stirred just prior to milling. This mixture was then milled exactly as in Example 3 and gave a product which showed greatly increased colouristic strength, lightfastness, and heat stability (oven heat stability test carried out on the remilled hides for 30 minutes at 180° C. and the hides then compression-moulded for 5 minutes at 170° C.) compared to a similar PVC composition containing Pigment Yellow 61.

EXAMPLE 7

0.35 Parts pigment of Example 1 treated exactly as in Example 6 gave a product which showed greatly increased colouristic strength, lightfastness, and heat stability over the product of Belgian Pat. No. 854.223 when treated in an identical manner.

EXAMPLE 8

A pigment—ABS (acrylonitrile-butadien-styrene copolymer) composition was produced on a Schwabenthan Type VV mill operating under the following conditions:

| | | |
|---|---|---|
| Front Roll | 160° C. | 29 r.p.m. |
| Rear Roll | 140° C. | 24 r.p.m. |

Polymer (100 parts—ABS, Cycolac T granules) was banded on the front mill (nip setting 0.3 mm.) and 13.5 parts of the organic pigment of Example 1, with 20 parts TiO$_2$ (Kronos RN56) added over a period of 5 minutes. A further 900 parts of polymer was added gradually and milling continued for 5 minutes after addition of the last of the polymer. The nip setting was then adjusted to 3 mm. and the hide calendered off. This material was injection moulded at 200° C. with a 12 second dwell time, or compression moulded at 180° C. for 5 minutes to produce a bright, greenish-yellow product which showed considerably enhanced colour strength over a similar product containing Pigment Yellow 61. (29.4 parts of Pigment Yellow 61 treated in an identical manner were required to match the strength of the above product).

EXAMPLE 9

A pigment—GPPS (general purpose polystyrene) composition was produced on a Schwabenthan Type VV mill operating under the following conditions:

| | | |
|---|---|---|
| Front Roll | 145° C. | 29 r.p.m. |
| Rear Roll | 110° C. | 24 r.p.m. |

Polymer (100 parts) was banded on the front roll (nip setting 0.3 mm.) and 0.7 parts of the organic pigment of Example 1, with 20 parts TiO$_2$ (Kronos RN56) added over a period of 5 minutes. A further 900 parts of polymer was added gradually, and milling continued for 5 minutes after addition of the last of the polymer. The nip setting was then adjusted to 3 mm. and the hide calendered off. This material was injection moulded at 200° C. with a 12 second dwell time, or compression moulded at 180° C. for 5 minutes to produce a bright, greenish-yellow product which showed considerably enhanced colour strength over a similar product containing Pigment Yellow 61. (1.43 parts of Pigment Yellow 61 treated in an identical manner were required to match the strength of the above product).

EXAMPLE 10

A pigment—HIPS (high impact polystyrene) composition was produced on a Schwabenthan Type VV mill operating under the following conditions:

| | | |
|---|---|---|
| Front Roll | 155° C. | 29 r.p.m. |
| Rear Roll | 110° C. | 24 r.p.m. |

Polymer (100 parts) was banded on the front roll (nip setting 0.3 mm) and 6.7 parts of the organic pigment of Example 1, with 10 parts TiO$_2$ (Kronos RN56) added over a period of 5 minutes. A further 900 parts of polymer was added gradually, and milling continued for 5 minutes after addition of the last of the polymer. The nip setting was then adjusted to 3 mm. and the hide calendered off. This material was injection moulded at 200° C. with a 12 second dwell time, or compression moulded at 180° C. for 5 minutes to produce a bright, greenish-yellow product which showed enhanced colour strength over a similar product containing Pigment Yellow 61. (15 parts of Pigment Yellow 61 treated in an identical manner were required to match the strength of the above product).

EXAMPLE 11

Preparation of air-drying alkyd paint composition

16 Parts of the product of Example 1 are ball-milled for 16 hours with 32 parts Uralac P.470 (a long oil soya pentaerythritol alkyd resin) (ex Synthetic Resins Ltd.) and 21 parts white spirit. The resulting millbase is then reduced with 77 parts Uralac P.470 in two stages (to avoid resin shock) and 3.84 parts cobalt naphthenate drier solution. The resulting paint composition gives strong, bright, greenish yellow films exhibiting very good light and weather fastness.

EXAMPLE 12

Preparation of stoving alkyd-melamine paint composition

9 Parts of the product of Example 1 are ball-milled for 16 hours with 22.5 parts Beetle 99/5 resin (a short oil alkyd resin) (ex B.I.P. Ltd.) and a solvent mixture consisting of 14.6 parts n-butanol and 43.9 parts xylene. To this concentrate is added 30 parts Beetle 99/5 resin, 5.6 parts xylene and 1.9 parts n-butanol while stirring. Stirring is continued for 30 minutes, after which 22.5 parts of Beetle BE.672 are added. The mixture is ball-milled for a further 15 minutes. The resulting full shade paint composition gives a strong greenish-yellow film which is very bright and is accompanied by very good overspray fastness, heat stability, and light and weather fastness, and is free from blooming.

Comparison

A paint composition is prepared as in Example 12, substituting Pigment Yellow 3 for the product of Example 1. The resulting composition produces a film which has inferior overpaint fastness and exhibits blooming of the pigment through the film surface.

EXAMPLE 13

The composition of Example 3, 5.1 parts, is reduced by the addition of a standard white alkyl-melamine formaldehyde paint, 30.0 parts which is prepared in a similar fashion to the composition of Example 3 and has a pigmentation of 30% (using Tioxide R-CR3 ex Tioxide International Ltd.) and a pigment to binder ratio of 1:1.25 at 53.2% medium solids, with an alkyd:melamine ratio of 70:30. The paint produced exhibits good strength and brightness, accompanied by very good overspray fastness and lightfastness and is free from blooming.

EXAMPLE 14

9 Parts of the product of Example 1 are ball-milled for 40 hours with 22.5 parts Epok D.1202 (hydroxy-acrylic resin, 60% in xylene:n-butanol 1:1) (ex. B.P. Chemicals (U.K.) Ltd.). To this concentrate is added 30 parts Epok D.1202 while stirring. Ball-milling is continued for 30 minutes, after which 20.7 parts Epok U.9193 are added. The mixture is ball-milled for a further 15 minutes. The resulting full-shade paint composition gives a strong, greenish-yellow film which is very bright and is accompanied by very good overspray fastness, heat stability, and light and weather fastness, and is free from blooming.

EXAMPLE 15

The composition of Example 6, 5 parts, is reduced by the addition of a standard white acrylic paint, 30 parts, which is prepared in a similar fashion to the composition of Example 6 and has a pigmentation of 25% (using Tioxide R-CR3) (ex Tioxide International Ltd.) and a pigment to binder ratio of 1:5.0 at 31.2% medium solids, with an acrylic:melamine/formaldehyde ratio of 70:30. The paint produced exhibits good strength and brightness, accompanied by very good overspray fastness and lightfastness, and is free from blooming.

EXAMPLE 16

Preparation of thermosetting acrylic paint composition

9 Parts of the product of Example 1 are ball-milled for 40 hours with 22.5 parts Dynocryl H-2103 (a thermosetting hydroxy-acrylic resin, supplied at 60% medium solids in 1:1 xylol:n-butanol) (ex Charles Tennant & Co. Ltd.) and 58.5 parts xylene. To this concentrate is added 30 parts Dynocryl H-2103 and 7.5 parts xylene. Milling is continued for 30 minutes, after which 22.5 parts Dynomin Ml-11 (isobutylated melamine formaldehyde resin, supplied at 60% medium solids in isobutanol; ex. Charles Tennant & Co. Ltd.) are added. The mixture is ball-milled for a further 15 minutes, then discharged and allowed to stand at room temperature for 24 hours before use. The resulting full-shade paint composition gives a strong, greenish-yellow film which is very bright, and is accompanied by very good overspray fastness, heat stability, and light and weather fastness, and is free from blooming.

EXAMPLE 17

The composition of Example 6, 25 parts, is reduced by the addition of a standard white acrylic-melamine formaldehyde paint, 50 parts, which is prepared in a similar fashion to the composition of Example 6 and has a pigmentation of 30% (using Tioxide R-CR3, ex. Tioxide International Ltd.) and a pigment to binder ratio of 1:1.25 at 53.2% medium solids, with an acrylic:melamine formaldehyde ratio of 70:30. This composition is further reduced by addition of 75 parts of a non-volatile clear lacquer which comprises 2625 parts of Dynocryl H-2103, 1125 parts of Dynomin MI-11, and 750 parts xylene. This clear acrylic laquer has a solids content of 50%, and an acrylic:melamine ratio of 70:30. The above mixture, comprising stainer, white enamel and clear lacquer, in an appropriate container is then placed on a Red Devil shaker for 5 minutes to ensure thorough mixing. The reduction is then thinned with xylene to 18 seconds viscosity using a Ford No. 4 cup. The paint produced exhibits good strength and brightness, accompanied by very good overspray fastness and is free from blooming.

What I claim is:

1. A colored synthetic plastics mass formed by homopolymerization or copolymerization of monomers containing a vinyl or vinylidene group or a blend of such polymers having incorporated therein the calcium salt of the dyestuff from diazotized 2-nitroaniline-4-sulphonic acid and acetoacet—o—chloroanilide.

2. A colored synthetic plastics mass as claimed in claim 1, in which the plastics mass is polyvinyl chloride, polyethylene or polystyrene.

* * * * *